United States Patent
Butler et al.

(10) Patent No.: US 6,771,743 B1
(45) Date of Patent: Aug. 3, 2004

(54) VOICE PROCESSING SYSTEM, METHOD AND COMPUTER PROGRAM PRODUCT HAVING COMMON SOURCE FOR INTERNET WORLD WIDE WEB PAGES AND VOICE APPLICATIONS

(75) Inventors: Nicholas David Butler, Romsey (GB); Jeremy Peter James Hughes, Southampton (GB); Stephen Graham Copinger Lawrence, Southampton (GB); Susan Malaika, London (GB); Lawrence Leon Porter, Lyndhurst (GB)

(73) Assignee: International Business Machines Corporation, Armonk, NY (US)

( * ) Notice: Subject to any disclaimer, the term of this patent is extended or adjusted under 35 U.S.C. 154(b) by 936 days.

(21) Appl. No.: 08/909,950

(22) Filed: Aug. 12, 1997

(30) Foreign Application Priority Data

Sep. 7, 1996 (GB) .............................................. 9618732

(51) Int. Cl.[7] .......................... H04M 1/64; H04M 11/00
(52) U.S. Cl. ................ 379/67.1; 379/88.13; 379/88.14; 379/88.17; 379/88.18
(58) Field of Search ............................ 379/67.1, 88.13, 379/88.14, 88.17, 93.24, 100.01, 93.15, 201, 209, 216, 265, 902, 88.18; 704/270, 271, 275; 707/513, 501, 531; 709/204, 206, 218, 227

(56) References Cited

U.S. PATENT DOCUMENTS

| | | | |
|---|---|---|---|
| 5,530,740 A | | 6/1996 | Irribarren et al. ......... 379/88.17 |
| 5,530,852 A | * | 6/1996 | Meske, Jr. et al. .......... 395/600 |
| 5,572,643 A | * | 11/1996 | Judson ........................ 395/793 |
| 5,675,507 A | * | 10/1997 | Bobo, II .................. 364/514 R |
| 5,799,063 A | * | 8/1998 | Krane ....................... 379/88.17 |
| 5,850,433 A | * | 12/1998 | Rondeau ...................... 379/201 |
| 5,884,032 A | * | 3/1999 | Bateman et al. ........ 395/200.34 |
| 5,884,262 A | * | 3/1999 | Wise et al. .................. 704/270 |
| 5,903,727 A | * | 5/1999 | Nielsen ....................... 709/212 |
| 5,915,001 A | * | 6/1999 | Uppaluru .................. 379/88.22 |
| 5,953,392 A | * | 9/1999 | Rhie et al. ................ 379/88.13 |
| 6,240,448 B1 | * | 5/2001 | Imielinski et al. .......... 709/218 |

FOREIGN PATENT DOCUMENTS

| | | | |
|---|---|---|---|
| EP | 0615368 | 9/1994 | |
| EP | 0878948 A2 * | 3/1998 | ............ H04M/7/00 |
| WO | WO96/20553 | 7/1996 | |
| WO | WO 97/40611 | * 10/1997 | ............ H04L/29/06 |

* cited by examiner

Primary Examiner—Allan Hoosain
(74) Attorney, Agent, or Firm—Jeanine S. Ray-Yarletts; Jerry W. Herndon

(57) ABSTRACT

A voice processing system, method and computer program product therefor, allows telephone callers without computers to access World Wide Web pages from the Internet. Usual graphical-based Hyper-Text Mark-Up language (HTML) commands are interspersed with special HTML tags including the commands and data for forming a voice application, which, when run on the voice processing system, provides a voice browser for allowing telephone callers to access Web pages. The voice application tags are provided together with the remainder of the HTML document, thus facilitating editing of the combined data. This helps to keep the graphical browser and voice browser versions of the same data set synchronized.

12 Claims, 1 Drawing Sheet

US 6,771,743 B1

VOICE PROCESSING SYSTEM, METHOD AND COMPUTER PROGRAM PRODUCT HAVING COMMON SOURCE FOR INTERNET WORLD WIDE WEB PAGES AND VOICE APPLICATIONS

FIELD OF THE INVENTION

The present invention relates generally to a computer system which handles incoming telephone calls and allows callers to access information via the computer system without the need for a live operator. The invention relates more specifically to a voice processing system, method and computer program product which allows the caller to access Internet World Wide Web pages by using only the caller's telephone.

BACKGROUND OF THE INVENTION

In the past couple of years there has been an explosive growth in the use of the globally-linked network of computers known as the Internet, and in particular of the WorldWide Web (WWW), which is one of the facilities provided on top of the Internet. The WWW comprises many pages or files of information, distributed across many different server computer systems. Information stored on such pages can be, for example, details of a company's organization, contact data, product data and company news. This information can be presented to the user's computer system ("client computer system") using a combination of text, graphics, audio data and video data. Each page is identified by a Universal Resource Locator (URL). The URL denotes both the server machine, and the particular file or page on that machine. There may be many pages or URLs resident on a single server.

In order to use the WWW, a client computer system runs a piece of software known as a graphical Web browser, such as WebExplorer (provided as part of the OS/2 operating system from IBM Corporation), or the Navigator program available from Netscape Communications Corporation. "WebExplorer", "OS/2" and "IBM" are trademarks of the International Business Machines Corporation, while "Navigator" and "Netscape" are trademarks of the Netscape Communications Corporation. The client computer system interacts with the browser to select a particular URL, which in turn causes the browser to send a request for that URL or page to the server identified in the URL. Typically the server responds to the request by retrieving the requested page, and transmitting the data for that page back to the requesting client computer system (the client/server interaction is performed in accordance with the hypertext transport protocol ("HTTP")). This page is then displayed to the user on the client screen. The client may also cause the server to launch an application, for example to search for WWW pages relating to particular topics.

Most WWW pages are formatted in accordance with a computer program written in a language known as HTML (hypertext mark-up language). This program contains the data to be displayed via the client's graphical browser as well as formatting commands which tell the browser how to display the data. Thus a typical Web page includes text together with embedded formatting commands, referred to as tags, which can be used to control the font size, the font style (for example, whether italic or bold), how to lay-out the text, and so on. A Web browser "parses" the HTML script in order to display the text in accordance with the specified format. HTML tags are also used to indicate how graphics, audio and video are manifested to the user via the client's browser.

Most Web pages also contain one or more references to other Web pages, which need not be on the same server as the original page. Such references may generally be activated by the user selecting particular locations on the screen, typically by (double) clicking a mouse control button. These references or locations are known as hyperlinks, and are typically flagged by the browser in a particular manner (for example, any text associated with a hyperlink may be in a different colour). If a user selects the hyperlink, then the referenced page is retrieved and replaces the currently displayed page.

Further information about HTML and the WWW can be found in "World Wide Web and HTML" by Douglas McArthur, p18–26 in Dr Dobbs Journal, December 1994, and in "The HTML SourceBook" by Ian Graham, (John Wiley, New York, 1995).

Another common way of allowing people to automatically access information is allowing users to use their telephones to call-in to a company's voice processing system (VPS) to obtain information in audio-only form (without the need for a computer). The VPS automatically handles the call and presents the caller with a menu of possible information which the caller can access, all under control of the central control system's computer. An example of such a VPS is the IBM AIX DirectTalk/6000 software package running on IBM's RISC System/6000 computer system ("AIX DirectTalk/6000" and "RISC System/6000" are all trademarks of the International Business Machines corporation).

If suppliers of information over the WWW were to also supply the same information via telephone-based systems, the reach of the information would be greatly expanded to people who do not have computers and instead call the supplier on a standard telephone to obtain the information. A known "voice browser" system developed by NetPhonic Communications, Inc., called "Web On Call" provides this ability ("NetPhonic Communications" and "Web On Call" are trademarks of NetPhonic Communication, Inc.).

With "Web On Call", a telephone-based VPS automatically answers incoming calls by running a voice application which instructs the VPS as to how to deal with the incoming calls and provide the caller with the appropriate information. This voice application accesses Web pages which are provided as data for the voice application, thus allowing the caller to have access to information contained in the Web pages.

For example, the HTML program of a Web page is modified by the programmer so that some basic voice application commands are added into the HTML program as extra control tags. These control tags are ignored by a graphical browser when a user is accessing the Web page via a client computer system. However, when a user does not have a computer system, and instead calls-in using a telephone, these control tags have meaning to the "voice browser" voice application which processes the control tags and is controlled accordingly. For example, the control tags tell the voice application whether to read or ignore certain text contained in the HTML program.

When text is to be read to the caller, a pre-recorded voice segment is retrieved from memory, under the control of the voice browser's voice application, and presented to the caller.

With the "Web On Call" software product, the voice application is provided separately from the HTML Web page. The HTML Web page has only basic commands included therein, such as commands to fetch a voice segment. That is, all of the voice application's structural intelligence is in the voice application itself, with only basic data provided in the HTML document.

If the information supplier wishes to change the information structure both the voice application and the HTML page have to be altered separately. For example, if the information supplier wishes to add another user-selectable command, such as "press the '8' key on your telephone keypad if you wish to repeat the information unit which you have just heard", it is necessary to edit both the voice application and the HTML page to make this change. The structure of the voice application would have to be changed to provide the functionality of allowing the caller to hear the previously supplied information again. The HTML application would have to be changed to include the data relating to the words the caller will hear to inform the caller that the "8" key is the key which the caller must press in order to execute this new command. In addition, there is the added problem that each Web page made accessible to the caller would have to be so-modified.

Another difficulty with the prior art is that the same voice application commands must be shared by each Web page accessible through the voice browser. For example, the same three user-commands, e.g., "Press '1' to . . . ," must be used in providing every Web page to a caller. This is again due to the separation of the voice processing system commands (in the voice browser's voice application) and the voice processing system data (in the HTML document).

SUMMARY OF THE INVENTION

According to the present invention, the above problems are solved by integrating more closely the voice application and the HTML pages together. The voice application commands as well as data are contained within the HTML Web pages. A voice browser ignores all HTML-tag information written for a graphical Web browser and a graphical Web browser ignores all HTML-tag information written for the voice browser. This way, the same HTML document is accessible to both computer users (via a graphical Web browser) and to telephone callers (via a voice browser).

With the present invention, it becomes very easy to maintain synchronism between the voice application commands and the voice application data, since both are contained in the same place, i.e., in the HTML Web page. To make a change, the programmer need only access the HTML Web page and modify both the voice application commands and data at the same time. There is no need to also access the voice browser's internal voice application and make changes to it as well. Further, different caller-initiated commands can be easily assigned to different Web pages.

According to the invention, a voice processing system, method and computer program product (stored on a computer-readable medium such as hard disk, floppy disk or semiconductor memory) therefor, allows telephone callers without computers to access World Wide Web pages from the Internet. Usual Hyper-Text Mark-Up language (HTML) information is interspersed with special HTML tags including the commands and data for forming a voice application, which, when run on the voice processing system, provides a voice browser for allowing telephone callers to access Web pages. Preferably, the special HTML tags include designations of the telephone keys a caller must press in order to actuate commands while accessing the HTML documents. The voice application tags are provided together with the remainder of the HTML document, thus facilitating editing of the combined data. This helps to keep the graphical browser and voice browser versions of the same data set synchronized.

A voice processing system for allowing telephone callers to access Hyper-Text Mark-Up Language (HTML) documents without the use of a computer, said voice processing system comprising:

caller input/output port connected to a telephone network of telephone callers;

processing unit which runs a voice application; and data communications network input/output port connected to a data communications network accessing HTML documents;

wherein at least one of said HTML documents has voice application HTML tags inserted therein, said tags providing the commands and data required to form said voice application.

A method of allowing a telephone caller to obtain access to World Wide Web (WWW) pages comprising steps of:

obtaining information from an incoming call;

retrieving a WWW home page corresponding to said obtained information; and running a voice application based on said retrieved WWW home page to interact with said caller to provide the WWW page data to the caller via the telephone line;

wherein said WWW home page has voice application tags inserted therein, said tags providing the commands and data required to form said voice application.

A computer program product stored on a computer-readable storage medium, said product comprising:

Hyper-Text Mark-Up language (HTML) information for instructing the display of data on a graphical Web browser; and voice application information interspersed amongst said HTML information as HTML tags containing the commands and data required to form a voice application for use in allowing a telephone caller to access HTML documents.

In a voice processing system, an apparatus for converting a Hyper-Text Mark-Up language (HTML) document into a voice application for allowing telephone callers to access World Wide Web pages, said apparatus comprising:

receiving means for receiving an HTML document, said HTML document having voice application information interspersed amongst other HTML information as HTML tags containing the commands and data required to form said voice application;

converting means for converting said HTML document into a voice application by interpreting said HTML tags.

BRIEF DESCRIPTION OF THE DRAWINGS

FIG. 2 is a flowchart showing the steps performed by the voice processing system of FIG. 1, according to a preferred embodiment of the present invention, when a caller calls-in.

DETAILED DESCRIPTION OF THE PREFERRED EMBODIMENTS

Figure 1:
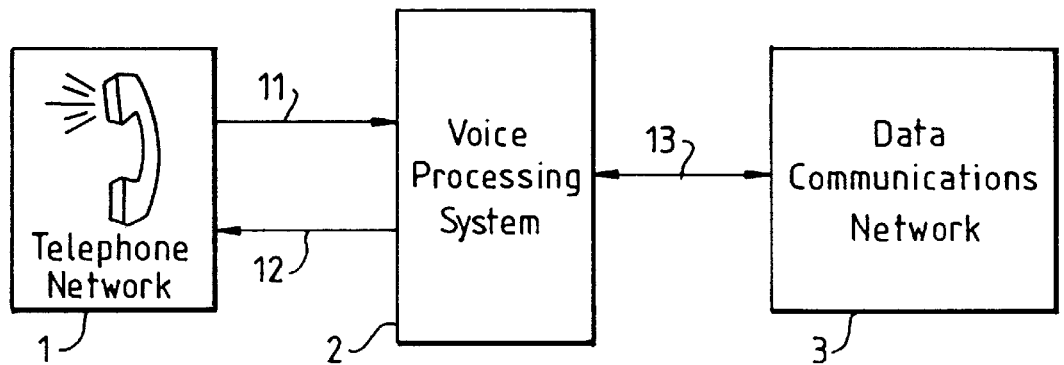
FIG. 1 is a block diagram of the overall environment in which a preferred embodiment of the present invention will operate.

In FIG. 1, using a standard telephone network 1, callers access a voice processing system 2, such as the IBM DirectTalk 6000 software product running on an IBM Risc System 6000 computer system. The voice processing system 2 accesses an external data communications network 3, which can be, for example, the Internet. The details of how the IBM DirectTalk 6000 product operates are well known to the skilled artisan, and are described in the product manual *General Information and Planning, IBM AIX DirectTalk/6000, Release* 6, December 1995.

As is well known, the voice processing system 2 receives incoming telephone calls over line 11, automatically answers the call and acts according to a voice application to interact with the call, providing responses to the caller via line 12.

As is also well known, the voice processing system 2 creates the spoken words to send to the caller in one of two ways. The first is text-to-speech conversion, where printed text is digitally converted to speech using, for example, digital signal processing circuitry. The second way is teleprompting, where text is read by a human speaker and the spoken word equivalent of the text is stored in memory, such as a magnetic recording disk.

Figure 2:
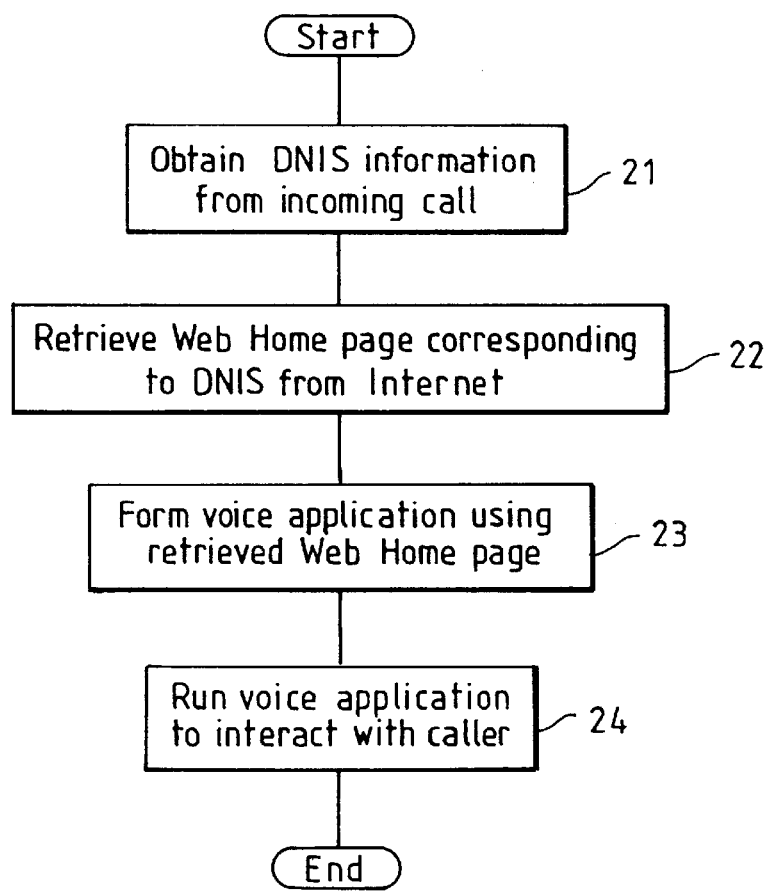

As shown in FIG. 2, according to one embodiment of the invention, when the caller first calls-in to the voice processing system, the specific telephone number dialled by the caller is recognized by the voice processing system (step 21) according to a well-known technique known as Dialled Number Identification Service (DNIS). The recognized DNIS data is then used by the voice processing system (step 22) to access data corresponding to that telephone number. In the preferred embodiment a specific dialled phone number is recognized and used by the voice processing system 2 to retrieve a corresponding Web home page (initial Web page for first presenting to the caller) from the Internet. This Web home page is accessed by the voice processing system 2 from the data communications network 3 via line 13 of FIG. 1.

Each Web home page which corresponds to a dialled phone number is pre-modified by adding special HTML-tags so that the HTML code of the Web home page contains both commands and data required for forming the voice application. This modified HTML Web home page is then used by the voice processing system 2 to form a voice application (step 23) for running on voice processing system 2 (step 24) for interaction with the caller. In this way, a caller is able to obtain the contents of a Web page over a standard telephone without the need for a computer.

In step 23, the voice application for running on the voice processing system is formed "on the fly" by interpreting the HTML information (including the added tags) by an application written in the voice processing system's own language. In this way, any changes which have been made to the HTML information will be instantly reflected to the voice browser users. In this embodiment, if text-to-speech conversion is used in presenting vocal responses to the caller, the digital signal processing required to obtain the vocal responses is performed during the formation of the voice application each time a caller calls-in to the voice processing system 2.

As an alternative embodiment to the above way of forming the voice application, a compiler program could pre-convert the HTML information, off-line, into program code that the voice processing unit 2 understands. According to this latter embodiment, step 23 of FIG. 2 would not follow step 22, but would be performed before the incoming call is received, in a separate batch pre-processing stage. Thus, when text-to-speech conversion is used, digital representations of the converted vocal responses are stored in memory during the batch pre-processing stage, and thus it is not necessary to perform the digital signal processing required to obtain the vocal responses each time a caller calls-in. The pre-processing stage would be run again on the updated HTML document each time the HTML document is modified, and the results are substituted for the previous compilation results, stored in a computer-readable storage medium such as a hard disk, floppy disk or semiconductor memory.

EXAMPLE

An example of such a modified HTML home page document will now be considered. After each portion of HTML code, an explanation will be given of the portion's purpose. It should be kept in mind, however, that the lines of code are meant to be provided in sequential order in the HTML document of the Example.

<IMG src="./company_logo.gif" alt="Company Logo"><BR>

This first line of HTML code is not for use by the telephone user. For the computer-based user the graphical Web browser will display a graphical image of the company logo on the client computer's display screen.

<VRU tts="Welcome to">

This second line of HTML code is for use by the voice processing system and the voice processing system performs a text-to-speech conversion on the words "Welcome to" so that the audio words "Welcome to" are articulated over line 12 to the telephone user. The graphical Web browser would not use this information, since the HTML tag "VRU tts" designates that this is an HTML tag only meaningful to the voice application and the graphical Web browser will ignore this tag. The letters "VRU" stand for "voice response unit", another name for the voice processing system 2.

<h2>The "Fictitious Mail Order Company" ordering service</h2>

These words would be displayed by the graphical browser and read by the voice browser using text to speech conversion.

The above code group presents an introduction to the user of the company providing the information service. The next group of code will give the user an option to learn about the "hot discounts" which the company has to offer. In order to access the "hot discounts" information, the Web home page temporarily branches off to another Web page which has the "hot discounts" data stored therein. This "branching off" concept is known as "hyperlinking", as explained above.

<P>

<A href="discount.html">

This first line of code designates the URL of the hyperlinked Web page which has the "hot discounts" information stored therein.

<VRU segment="press_1_to">

<VRU segment="listen_to">

These two lines of code instruct the voice processing system to retrieve a prestored voice segment of the words "press 1 to" and "listen to" for presenting to the caller via line 12. The words "press 1 to" and "listen to" were previously recorded by a human speaker and stored into a database accessible by the voice processing system 2. Again, these lines of code are ignored by the graphical browser since the VRU tags are used.

This month's hot discounts

</A>

This last line of code in this code group is both presented in textual format via the graphical browser and presented in audio format via the voice browser. Because this is a hypertext link, if the telephone user presses the "1" button on his telephone keypad, or if the computer client double clicks on the mouse button when the cursor is placed over the textual words "This month's hot discounts", the user will gain access to the information contained in the Web page having the URL address "discount.html". This Web page would have a list of discounted items for sale and prices for each item.

This Web page could also be provided with voice application tags. Alternatively, the voice application could simply "read" the entire contents of the linked Web page to the voice-only user, using either text-to-speech conversion or prestored voice segments.

A next code group is identical in function to the above group, and thus a detailed explanation will not be given. The purpose of this code group is to provide the user with another dataset choice, this time it is data relating to placing an order. If the user selects this option, a hypertext linked Web page called "place_order.html" is accessed and presented to the user.

<P>

<A href="place_order.html">

<VRU segment="press_2_to">

Place an order

</A>

The last code group in this Example also relates to a hypertext link, but is different from the above since it illustrates the inherent differences between words used when using a graphical browser from those used when using a voice browser.

<P>

<A href="search_database.html">

<VRU segment="press_3_to">

Again, these first two lines provide the same functionality as in the above two examples, and list the hypertext document (first line) and provide a voice browser-only spoken word segment "press 3 to".

<VRU ignore> Look at </VRU ignore><VRU tts="Use"> the catalogue

</A>

With a voice browser, the caller is not able to "look at" information. Therefore, the words "Look at" are bracketed by HTML tags informing the voice processing unit to ignore the bracketed words. These words "Look at" are provided only to the graphical browser user, since it only makes sense to provide these words to this user, due to the inherent differences between the two types of browsers. Instead, the voice browser does a text-to-speech conversion on the alternate word "Use". The words "the catalogue" are then provided to the users of both browsers.

The above code group allows the user to access a database containing the entire catalogue (not just the "hot discounts").

<VRU tts="please make your choice">

This last line of code in only for the voice browser and asks the caller to please make a choice of one of the three options 1 through 3 using keys 1 through 3 on the caller's telephone keypad.

The present invention is not to be limited by the above described embodiments but only by the spirit and scope of the properly interpreted claims.

What is claimed is:

1. A voice processing system for allowing telephone callers to access Hyper-Text Mark-Up Language (HTML) documents without the use of a computer, said voice processing system comprising:

caller input/output port connected to a telephone network of telephone callers;

processing unit which runs a voice application; and data communications network input/output port connected to a data communications network accessing HTML documents;

wherein at least one of said HTML documents has voice application HTML tags inserted therein, said tags providing the commands and data required to form said voice application.

2. The system of claim 1 wherein said system further comprises means for forming said voice application using said at least one HTML document with voice application tags inserted therein.

3. The system of claim 2 wherein said means for forming forms said voice application each time an incoming call is received.

4. The system of claim 1 wherein said commands and data required to form said voice application include designations of telephone keys a caller can press to actuate commands while accessing said HTML documents.

5. A method of allowing a telephone caller to obtain access to World Wide Web (WWW) pages comprising steps of:

obtaining information from an incoming call;

retrieving a WWW home page corresponding to said obtained information; and running a voice application based on said retrieved WWW home page to interact with said caller to provide the WWW page data to the caller via the telephone line;

wherein said WWW home page has voice application tags inserted therein, said tags providing the commands and data required to form said voice application.

6. The method of claim 5 wherein said voice application is formed each time an incoming call is received.

7. The method of claim 5 wherein said commands and data required to form said voice application include designations of telephone keys a caller can press to actuate commands while accessing said WWW pages.

8. A computer program product stored on a computer-readable storage medium, said product comprising:

Hyper-Text Mark-Up language (HTML) information for instructing the display of data on a graphical Web browser; and voice application information interspersed amongst said HTML information as HTML tags containing the commands and data required to form a voice application for use in allowing a telephone caller to access HTML documents.

9. The product of claim 8 wherein said commands and data required to form said voice application include designations of telephone keys a caller can press to actuate commands while accessing said HTML documents.

10. In a voice processing system, an apparatus for converting a Hyper-Text Mark-Up language (HTML) document into a voice application for allowing telephone callers to access World Wide Web pages, said apparatus comprising:

receiving means for receiving an HTML document, said HTML document having voice application information interspersed amongst other HTML information as HTML tags containing the commands and data required to form said voice application;

converting means for converting said HTML document into a voice application by interpreting said HTML tags.

11. The apparatus of claim 10 wherein said means for converting converts said HTML document prior to the receipt of an incoming telephone call.

12. The apparatus of claim 10 wherein said commands and data required to form said voice application include designations of telephone keys a caller can press to actuate commands while accessing said HTML documents.

* * * * *